(12) United States Patent
Aoki

(10) Patent No.: US 9,160,905 B2
(45) Date of Patent: Oct. 13, 2015

(54) IMAGING APPARATUS AND INTERCHANGEABLE LENS

(71) Applicant: CANON KABUSHIKI KAISHA, Tokyo (JP)

(72) Inventor: Makoto Aoki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 14/022,374

(22) Filed: Sep. 10, 2013

(65) Prior Publication Data
US 2014/0078350 A1 Mar. 20, 2014

(30) Foreign Application Priority Data
Sep. 19, 2012 (JP) .................................. 2012-205970

(51) Int. Cl.
- *H04N 5/232* (2006.01)
- *H04N 5/217* (2011.01)
- *H04N 5/225* (2006.01)
- *H04N 5/357* (2011.01)

(52) U.S. Cl.
CPC ........... *H04N 5/2251* (2013.01); *H04N 5/2254* (2013.01); *H04N 5/232* (2013.01); *H04N 5/23287* (2013.01); *H04N 5/3577* (2013.01); *G03B 2205/0069* (2013.01)

(58) Field of Classification Search
USPC .................................................. 348/241, 357
See application file for complete search history.

(56) References Cited

U.S. PATENT DOCUMENTS

| 6,154,611 | A * | 11/2000 | Washisu | 396/55 |
| 2004/0136704 | A1* | 7/2004 | Usui | 396/55 |
| 2006/0064884 | A1* | 3/2006 | Seo | 33/1 M |
| 2009/0179992 | A1* | 7/2009 | Jeong et al. | 348/207.99 |
| 2010/0260493 | A1* | 10/2010 | Kato | 396/55 |
| 2011/0279899 | A1* | 11/2011 | Motoike et al. | 359/557 |

FOREIGN PATENT DOCUMENTS

JP  2011-054643 A  3/2011

* cited by examiner

*Primary Examiner* — Twyler Haskins
*Assistant Examiner* — Akshay Trehan
(74) *Attorney, Agent, or Firm* — Fitzpatrick, Cella, Harper & Scinto

(57) ABSTRACT

A camera includes a ferromagnetic member, which is formed of a ferromagnetic material into one of a plate shape and a film shape, and arranged between a coil and an imaging element so that a part of a flat surface is opposed to the coil. The ferromagnetic member has a thickness that is less than a skin depth, which is determined by a drive frequency of a coil, magnetic permeability of the ferromagnetic material, and electric conductivity of the ferromagnetic material. Accordingly, with the ferromagnetic member having a smaller thickness than before, an amount of arrival by which magnetic flux generated at the coil arrives at the imaging element may be reduced.

16 Claims, 6 Drawing Sheets

IMAGING APPARATUS AND INTERCHANGEABLE LENS

BACKGROUND OF THE INVENTION

1. Field of the Invention

The present invention relates to a technology of suppressing superimposition of magnetic field noise generated from a coil, which is implemented in an imaging apparatus main body or an interchangeable lens, on an imaging element.

2. Description of the Related Art

An imaging element to be mounted in an imaging apparatus such as a digital camcorder or a digital still camera has increased in ISO sensitivity in recent years, thereby being capable of imaging a more clear image even in a scene where a sufficient amount of light is unavailable, such as a night view. However, an increase in sensitivity gives rise to a problem in that small noise, which has not heretofore been a problem, affects the imaging element so as to cause an image disturbance.

For example, in a digital single lens reflex camera, a motor with a coil for driving a lens is provided in an interchangeable lens, and magnetic flux generated from the coil may affect the imaging element to cause the disturbance in the generated image.

In Japanese Patent Application Laid-Open No. 2011-54643, there is disclosed a structure in which a plate-like or film-like conductive member, which is made of a non-magnetic material and has an opening, is provided around the imaging element. When magnetic field noise due to high-frequency electromagnetic waves from the outside, variations in magnetic field, and the like is input into the imaging element, an eddy current flows through the conductive member. In this Japanese Patent Application Laid-Open No. 2011-54643, the magnetic field noise from the outside is cancelled by a demagnetizing field generated by the eddy current, to thereby reduce the magnetic field noise that is input into the imaging element.

In general, a skin depth d caused by a skin effect is expressed by: skin depth $d=\sqrt{1/(\pi \cdot f \cdot \sigma \cdot \mu)}$, where f is a frequency, $\mu$ is magnetic permeability, and $\sigma$ is electric conductivity. When a thickness of the conductive member formed of the non-magnetic material is less than the skin depth d, the thickness is small but the eddy current that flows through the conductive member is insufficient. As a result, the effect of cancelling the magnetic field noise is small, and the magnetic field noise penetrates through the conductive member to be input into the imaging element, which affects the picked-up image. Therefore, in order to allow enough eddy current to flow through the conductive member and in order to obtain the effect of cancelling the magnetic field noise by the demagnetizing field generated by the eddy current, the thickness of the conductive member needs to be the skin depth d or more.

As described above, with the conductive member described in Japanese Patent Application Laid-Open No. 2011-54643, the thickness needs to be the skin depth or more, and because the non-magnetic material has relative magnetic permeability of about 1, the thickness of the conductive member is inevitably increased. Therefore, in order to obtain the effect of cancelling the magnetic field noise by the conductive member while avoiding interference with another member, the imaging apparatus and the interchangeable lens have inevitably increased in size.

In view of the above, the present invention is directed to reducing an amount of arrival by which magnetic flux generated at a coil arrives at an imaging element by a ferromagnetic member having a smaller thickness than before.

SUMMARY OF THE INVENTION

An imaging apparatus according to an aspect of the present invention includes: an imaging element arranged to be opposed to an imaging optical system, for photoelectrically converting an optical image formed by the imaging optical system; a coil for generating magnetic flux by being supplied with an alternating current; and a ferromagnetic member, which is formed of a ferromagnetic material into one of a plate shape and a film shape, and arranged between the coil and the imaging element so that a part of a flat surface perpendicular to a thickness direction is opposed to the coil, in which the ferromagnetic member has a thickness that is less than a skin depth, which is determined by a drive frequency of the coil, magnetic permeability of the ferromagnetic material, and electric conductivity of the ferromagnetic material.

Further features of the present invention will become apparent from the following description of exemplary embodiments with reference to the attached drawings.

DESCRIPTION OF THE EMBODIMENTS

Hereinafter, embodiments of the present invention are described in detail with reference to the drawings.

First Embodiment

Figure 1A:
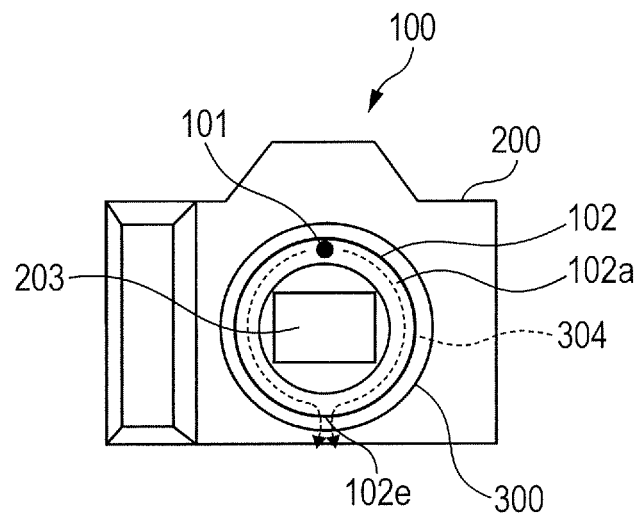
FIGS. 1A and 1B are explanatory diagrams illustrating a schematic configuration of an imaging apparatus according to a first embodiment of the present invention.
Figure 1B:
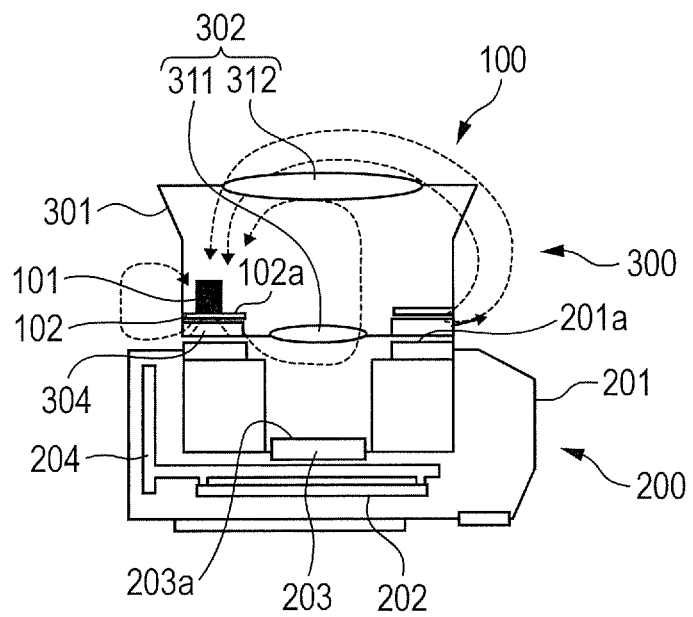

FIGS. 1A and 1B are explanatory diagrams illustrating a schematic configuration of a camera as an imaging apparatus according to a first embodiment of the present invention. FIG. 1A is a front view of the camera, and FIG. 1B is a cross-sectional view when the camera is viewed from above.

A digital still camera (camera) 100 as the imaging apparatus is a digital single lens reflex camera, and includes a camera main body 200 as an imaging apparatus main body, and an interchangeable lens (lens barrel) 300 that is attachable to and detachable from the camera main body 200.

The camera main body 200 includes an external camera case 201, which is a housing including a mount portion 201a to which the interchangeable lens 300 is attached, and a printed circuit board 202, which is housed in the external camera case 201 and in which circuit components for controlling an image signal are implemented. The camera main body 200 further includes an imaging element 203, which is housed in the external camera case 201 and includes a light receiving surface 203a. The printed circuit board 202 and the imaging element 203 are fixed to a metal frame 204, which is fixed to the external camera case 201.

The interchangeable lens 300 includes a lens housing 301 as a housing, and an imaging optical system 302, which is supported by the lens housing 301 and which forms an optical image on the light receiving surface 203a of the imaging element 203 when the interchangeable lens 300 (lens housing 301) is attached to the external camera case 201. The interchangeable lens 300 further includes a coil 101 of a drive motor, which is housed in the lens housing 301 and which adjusts a focus of the imaging optical system 302.

The imaging optical system 302 includes a lens 312 arranged on a light incident side of the lens housing 301, and a lens 311 arranged on a light exit side. The lens 311 is fixed to the lens housing 301, and as illustrated in FIG. 1A, is fixed to a lens mount 304, which is formed into a ring shape that is circular in front view. The lens mount 304 is formed of, for example, an electrically conductive non-magnetic material.

The imaging element 203 is a complementary metal oxide semiconductor (CMOS) image sensor, a charge-coupled device (CCD) image sensor, or the like, and is formed to have an external shape that is quadrangular in front view (when viewed from a direction perpendicular to the light receiving surface 203a of the imaging element 203).

The imaging element 203 is arranged in the external camera case 201 so that when the interchangeable lens 300 is attached to the external camera case 201, the light receiving surface 203a is opposed to the imaging optical system 302 (lens 311).

The imaging element 203 photoelectrically converts the optical image formed by the imaging optical system 302 on the light receiving surface 203a when the interchangeable lens 300 is attached to the external camera case 201, and outputs the image signal to the printed circuit board 202.

The coil 101 is arranged at a position at which an optical path from the imaging optical system 302 to the light receiving surface 203a of the imaging element 203 is not blocked, that is, as illustrated in FIG. 1A, the coil 101 is arranged to be located on the periphery of the imaging element 203 when viewed from the direction perpendicular to the light receiving surface 203a of the imaging element 203. Further, the coil 101 is arranged, as illustrated in FIG. 1B, on a side opposite to the camera main body 200 side with respect to the lens mount 304.

The coil 101 is operated by being supplied with an alternating current, which is a drive current having a drive frequency that is 1 kHz or more and is less than 1 MHz (in kHz band) in the first embodiment. The coil 101 generates magnetic flux by being energized, and is a magnetic field noise source for the imaging element 203.

Therefore, in the first embodiment, a plate-like or film-like ferromagnetic member 102 made of a ferromagnetic material is placed between the coil 101 and the imaging element 203. The ferromagnetic member 102 is housed in the lens housing 301. To be specific, the ferromagnetic member 102 is placed, as illustrated in FIG. 1B, between the coil 101 and the lens mount 304 so that a part of a flat surface 102a perpendicular to a thickness direction is opposed to the coil 101. In other words, the ferromagnetic member 102 is at a position where the part of the flat surface 102a is opposed to the coil 101, and is placed between the coil 101 and the imaging element 203 when the interchangeable lens 300 is attached to the camera main body 200. The ferromagnetic material constituting the ferromagnetic member 102 is also a conductive member.

The ferromagnetic member 102 is formed, as illustrated in FIG. 1A, to extend along the periphery of the imaging element 203 when viewed from the direction perpendicular to the light receiving surface 203a of the imaging element 203 in a state in which the interchangeable lens 300 is attached to the camera main body 200. The ferromagnetic member 102 is thus formed to extend along the periphery of the imaging element 203 so that, as described in detail later, the magnetic flux that otherwise flows into the imaging element 203 is effectively absorbed by the ferromagnetic member 102. It is preferred that the direction in which the ferromagnetic member 102 extends be substantially parallel, in particular, be parallel to a tangential direction of the light receiving surface 203a of the imaging element 203. It is also preferred that the flat surface 102a of the ferromagnetic member 102 be substantially parallel, in particular, be parallel to the light receiving surface 203a of the imaging element 203.

In the first embodiment, the ferromagnetic member 102 is formed to extend, when the imaging element 203 is viewed from the imaging optical system 302, from a center point of the coil 101 to both sides along the periphery of the imaging element 203. To be more specific, when the imaging element 203 is viewed from the imaging optical system 302, the ferromagnetic member 102 is formed into a shape that surrounds the imaging element 203, that is, as illustrated in FIG. 1A, in a ring shape that is circular in front view.

Note that, it is preferred that the frame-like ferromagnetic member 102 have a ring shape having uniform inner and outer diameters, but the inner and outer diameters may not be uniform as long as an optical path within the imaging optical system 302 and the optical path between the imaging optical system 302 and the imaging element 203 are not blocked.

Further, the ferromagnetic member 102 is formed into a ring shape that is circular in front view as illustrated in FIG. 1A. However, without being limited to the circular shape, the ferromagnetic member 102 may be formed into a ring shape that is elliptical in front view or polygonal in front view.

A skin depth d caused by the skin effect is expressed by: $d=\sqrt{1/(\pi \cdot f \cdot \sigma \cdot \mu)}$, where f is the drive frequency of the coil 101, μ is magnetic permeability of the ferromagnetic material, and σ is electric conductivity of the ferromagnetic material. In the first embodiment, a thickness of the ferromagnetic member 102 is less than the skin depth d.

The ferromagnetic member 102 is formed of the ferromagnetic material having larger relative magnetic permeability than that of the non-magnetic material, and hence the skin depth d caused by the skin effect is smaller than before. Further, the thickness of the ferromagnetic member 102 is less than the skin depth d, and hence the thickness of the ferromagnetic member 102 may be made smaller than before.

Figure 2A:
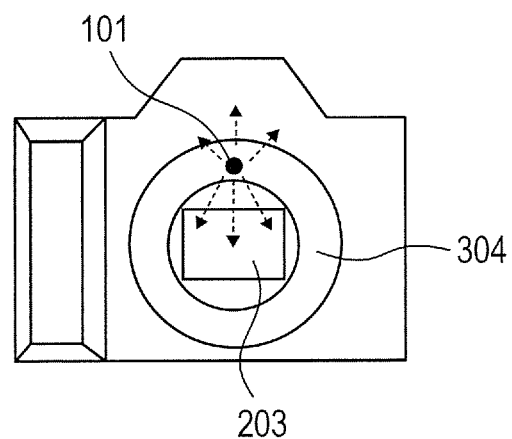
FIGS. 2A and 2B are explanatory diagrams illustrating a schematic configuration of an imaging apparatus according to a comparative example.
Figure 2B:
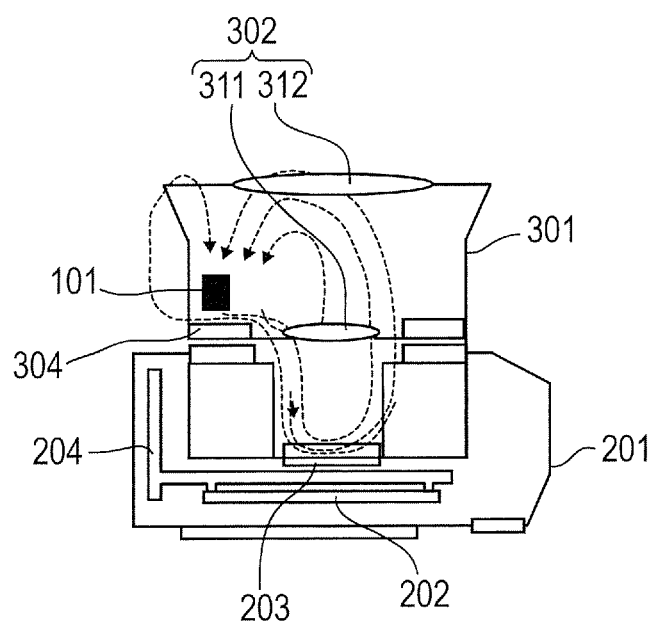

Now, an action of the ferromagnetic member 102 is described. FIGS. 2A and 2B are explanatory diagrams illustrating a camera as a comparative example in a case where the ferromagnetic member made of the ferromagnetic material is omitted from the camera 100 of FIGS. 1A and 1B. FIG. 2A is a front view of the camera, and FIG. 2B is a cross-sectional view when the camera is viewed from above. Note that, the dashed arrows illustrated in FIGS. 1A and 1B and FIGS. 2A and 2B indicate the magnetic flux (lines of magnetic force).

As illustrated in FIGS. 2A and 2B, when the coil 101 is driven to generate the magnetic flux (magnetic field), an eddy current is allowed to flow through the conductive lens mount 304 in accordance with Lentz's law. The eddy current has an action of cancelling the magnetic field in a normal direction that has been input perpendicularly to the surface of the lens mount 304.

However, the magnetic field in a tangential direction of the surface of the lens mount 304 is directly transmitted without being cancelled by the eddy current. There is no metal member in the optical path from the lens 311 to the imaging element 203, and the magnetic field in the tangential direction that has been input from the optical path is directly transmitted to the direction of the imaging element 203, with the result that noise components arrive at the imaging element 203.

In contrast, in the first embodiment, as illustrated in FIGS. 1A and 1B, the ferromagnetic member 102 made of the ferromagnetic material is used, and the thickness of the ferromagnetic member 102 is less than the skin depth d. With this configuration, the generated eddy current that forms a demagnetizing field is reduced, the effective magnetic permeability of the ferromagnetic member 102 is increased, and magnetoresistance of the ferromagnetic member 102 becomes lower than that of outside air (air).

Therefore, the magnetic flux generated by the coil 101 is effectively absorbed by the ferromagnetic member 102 and transmitted through the inside of the ferromagnetic member 102 made of the ferromagnetic material. To be specific, the magnetic flux (magnetic field) generated from the coil 101 is absorbed into the ferromagnetic member 102 made of the ferromagnetic material immediately below the coil 101 as illustrated in FIG. 1A.

The magnetic flux that has been absorbed into the ferromagnetic member 102 does not penetrate as opposed to the case of the non-magnetic material, but as indicated by the dashed arrows illustrated in FIG. 1A, substantially passes through the inside of the ferromagnetic member 102 from a part that is opposed to the coil 101 toward both sides along the direction in which the ferromagnetic member 102 extends. Then, the magnetic flux emanates from a distal end 102e on the side opposite to the part that is opposed to the coil 101 into the air.

As illustrated in FIG. 1B, the magnetic flux (magnetic field) that has emanated from the distal end 102e on the side opposite to the part that is opposed to the coil 101 into the air passes through the lens housing 301, and returns to the coil 101 from the side opposite to the lens mount 304.

Note that, the directions of the magnetic flux are indicated by the dashed arrows in FIGS. 1A and 1B, but are alternately switched between the directions of the dashed arrows and the opposite directions because the magnetic flux is an AC magnetic field that is generated by the alternating current.

The ferromagnetic member 102 made of the ferromagnetic material does not have a magnetic closed circuit structure that is closed within the ferromagnetic material, but the magnetic flux is transmitted through the air. However, the ferromagnetic member 102 acts as a bypass of the imaging element 203, with the result that the amount of arrival by which the magnetic flux generated at the coil 101 arrives at the imaging element 203 may be reduced, and hence the disturbance in the picked-up image may be suppressed. In other words, magnetic field noise that arrives at the imaging element 203 may be reduced.

Now, a detailed description is given of the thickness of the ferromagnetic member 102 made of the ferromagnetic material being less than the skin depth. In the first embodiment, as the ferromagnetic member 102, a ferromagnetic material such as permalloy having high magnetic permeability in a frequency band of 1 kHz to 1 MHz (kHz band), which is the drive frequency of the coil 101, is used. This material is a conductive material having high magnetic permeability, and hence has both the action of absorbing the magnetic flux and the action of cancelling the incident magnetic field when the eddy current flows in accordance with Lentz's law.

As the drive frequency becomes higher, the action of cancelling the incident magnetic field becomes higher along with the skin depth $d=\sqrt{(1/(\pi \cdot f \cdot \sigma \cdot \mu))}$. When the skin depth d becomes smaller than the thickness of the ferromagnetic member 102, the magnetic field exists only in a shallow part at the surface of the ferromagnetic member 102 made of the ferromagnetic material (the skin depth d part) and the inside magnetic field becomes zero, and hence the function as a magnetic path for absorbing the magnetic flux disappears.

Therefore, in the first embodiment, for the ferromagnetic member 102, the material having high magnetic permeability at the drive frequency of the coil 101 is used for the action of absorbing the magnetic flux, and the thickness is smaller than the skin depth d in order to suppress the action of cancelling the incident magnetic field.

In regard to the effect of the thickness of the ferromagnetic member 102 on the magnetic permeability μ, the following measurement was performed. A specimen of 30 [mm]×110 [mm]×thickness d [mm] was made of permalloy PC. Then, by a general single sheet magnetic measurement method, with the drive frequency of the coil 101 being set to 30 [kHz], the specimen was applied with the magnetic field of 200 [A/m] to measure output voltage and current by a detection coil and calculate the magnetic permeability from the measurement results. The magnetic permeability obtained by the measurement is effective magnetic permeability including the effect of the eddy current. Therefore, when the effect of the eddy current becomes dominant, magnetic properties disappear to be substantially equal to the magnetic permeability in the air, and when there is no effect of the eddy current, the properties become equal to those of a magnetic substance having zero electric conductivity. Thicknesses of the specimen, the measurement results of the magnetic permeability, and the skin depths calculated by using the magnetic permeability as the measurement results are shown in Table 1.

TABLE 1

Measurement results of magnetic permeability and skin depths of permalloy PC

| Thickness d [mm] | Electric conductivity | Calculated value of magnetic permeability | Relative magnetic permeability | Skin depth | Less than skin depth? |
|---|---|---|---|---|---|
| 0.1 | $1.67 \times 10^6$ | $4.87 \times 10^{-4}$ | 388 | 0.107540603 | Yes |
| 0.5 | $1.67 \times 10^6$ | $2.58 \times 10^{-5}$ | 21 | 0.168134916 | No |
| 0.7 | $1.67 \times 10^6$ | $2.64 \times 10^{-5}$ | 21 | 0.222033101 | No |

From the above-mentioned results, when the thickness of the specimen is less than the skin depth calculated by using the effective magnetic permeability obtained by the single sheet magnetic measurement method, it was confirmed that high magnetic permeability as compared to the thickness of the skin depth or more may be obtained. When permalloy PC is used, the thickness of 0.1 [mm], which is less than the skin depth, is optimal. By thus forming the ferromagnetic member 102 of a metal containing permalloy as a main component, the thickness may be further reduced, and the magnetic flux that arrives at the imaging element 203 may be effectively reduced.

Note that, the thickness may be further reduced also when the ferromagnetic member 102 is formed of any one metal selected from the group consisting of nickel, cobalt, and iron, or a metal containing an alloy containing at least two of nickel, cobalt, and iron as a main component. Also in this case, the magnetic flux that arrives at the imaging element 203 may be effectively reduced.

A lower limit of the thickness in the first embodiment is 18 [μm] for FINEMET (trademark) manufactured by Hitachi Metals, Ltd., which is the thinnest of existing ferromagnetic materials. A compound composition of a FINEMET (trademark) sheet manufactured by Hitachi Metals, Ltd. contains iron as a main component as well as silicon, boron, and trace amounts of copper and niobium.

Now, conditions on the magnetic permeability of the ferromagnetic member 102 made of the ferromagnetic material are described. It is preferred that the relative magnetic permeability of the ferromagnetic member 102 be 100 or more. For verification, the following simulation was performed using Maxwell 3D, which is a magnetic field simulator manufactured by Ansys, Inc.

Figure 3A:
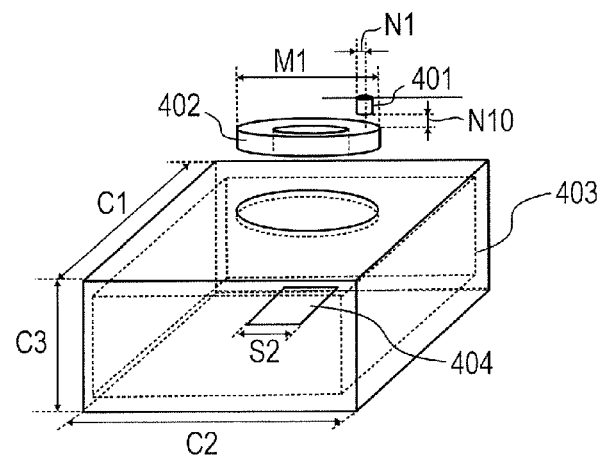
FIGS. 3A, 3B and 3C are explanatory diagrams illustrating a simulation model of the imaging apparatus according to the first embodiment.
Figure 3B:
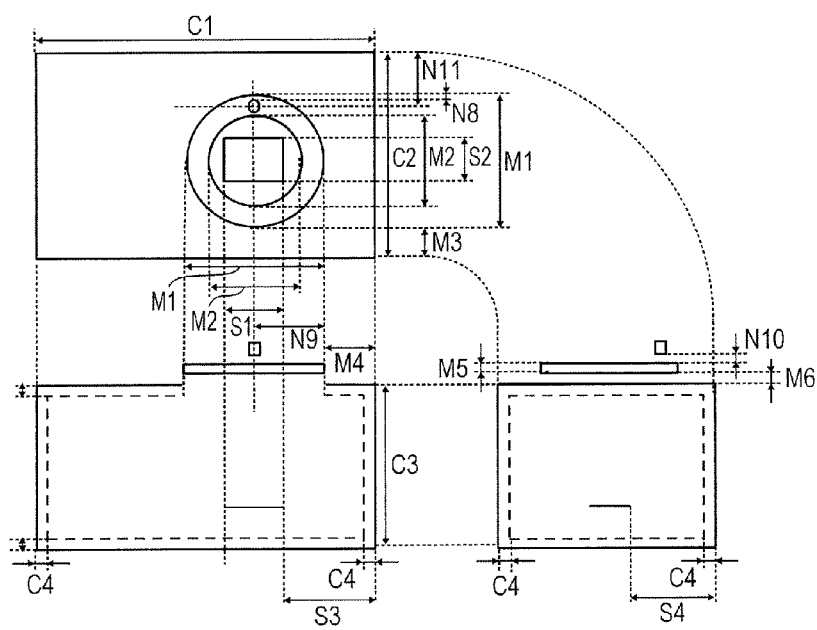
Figure 3C:
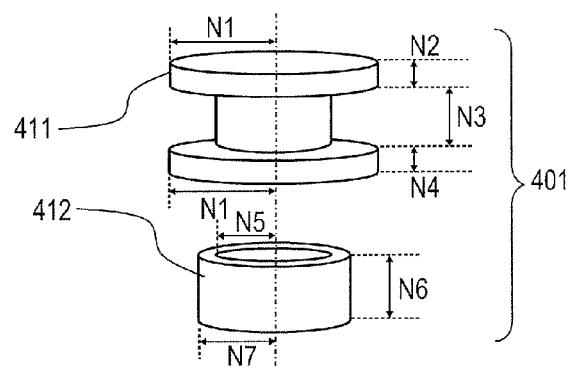

FIGS. 3A to 3C are explanatory diagrams illustrating a simulation model obtained by simplifying the shape of the camera 100 illustrated in FIGS. 1A and 1B, of which FIG. 3A is a perspective view of the model, FIG. 3B is an orthographic drawing of the model, and FIG. 3C is a view illustrating a model of the coil 101 as the noise source. In FIG. 3C, a core 411 and a copper wire 412 as components of a coil 401 corresponding to the coil 101 of FIGS. 1A and 1B are illustrated separately.

FIG. 3A illustrates a ferromagnetic member 402 corresponding to the ferromagnetic member 102 of FIGS. 1A and 1B, an external camera case 403 corresponding to the external camera case 201 of FIGS. 1A and 1B, and a light receiving surface 404 of the imaging element corresponding to the light receiving surface 203a of the imaging element 203 of FIGS. 1A and 1B.

A numeric value of the relative magnetic permeability of the ferromagnetic member 402 was changed in a range of from 1 to 1,000, and the magnetic flux that arrived at the light receiving surface 404 when the magnetic permeability was changed was observed. Table 2 below shows dimensions of the model of FIGS. 3A to 3C, and Table 3 below shows material constants of the models.

Note that, the light receiving surface 404 of the imaging element was set as a two-dimensional flat surface in the simulation for simplicity. As for the copper wire, a winding wire is wound around the core several times in an actual coil, but for simplicity, the winding wire was formed as a cylindrical block as illustrated in FIG. 3C, and the copper wire 412 was energized with 10 [A].

TABLE 2

Dimensions of simulation model [mm]

| S1 | S2 | S3 | S4 | M1 | M2 | M3 | M4 | M5 |
|---|---|---|---|---|---|---|---|---|
| 24 | 22 | 44 | 33 | 60 | 42 | 14 | 26 | 0.02 |

| M6 | C1 | C2 | C3 | C4 | N1 | N2 | N3 | N4 |
|---|---|---|---|---|---|---|---|---|
| 6 | 134 | 84 | 58 | 1 | 2.65 | 0.6 | 2.4 | 1.2 |

| N5 | N6 | N7 | N8 | N9 | N10 | N11 |
|---|---|---|---|---|---|---|
| 1.1 | 2.35 | 2.14 | 2.71 | 26 | 1.08 | 18.85 |

TABLE 3

Material constant of simulation model

| | Electric conductivity | Relative magnetic permeability | Permittivity |
|---|---|---|---|
| Coil core 411 | 0 | 600 | 1 |
| Coil copper wire 412 | $5.8 \times 10^7$ | 1 | 1 |
| Ferromagnetic member 402 | $1.03 \times 10^7$ | 10~1,000 | 1 |
| External case 403 | $2.25 \times 10^7$ | 1 | 1 |

Figure 4:
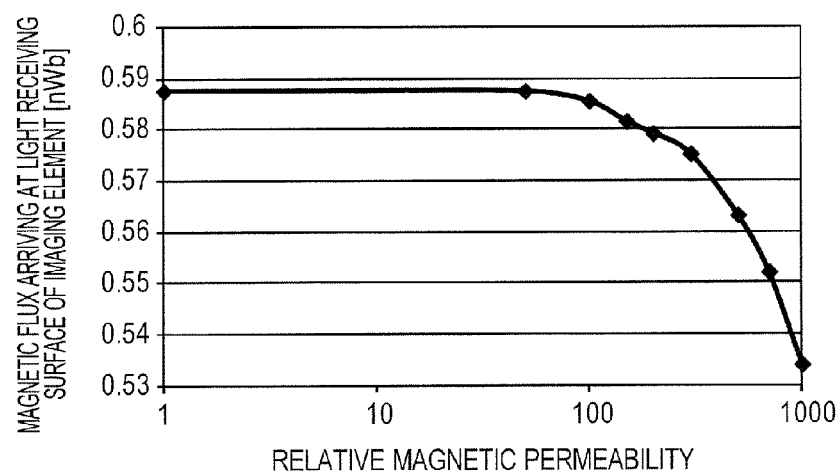
FIG. 4 is a graph showing a relationship between magnetic permeability of a ferromagnetic material and total magnetic flux of an imaging element according to the first embodiment.

FIG. 4 is a graph showing the total magnetic flux that arrived at the light receiving surface of the imaging element when the relative magnetic permeability was changed. It can be seen from FIG. 4 that when the relative magnetic permeability is 100 or more, the arriving magnetic flux is reduced significantly. Based on this result, it is preferred that the ferromagnetic member 102 made of the ferromagnetic material have the relative magnetic permeability of 100 or more.

Next, conditions on the arrangement of the ferromagnetic member 102 made of the ferromagnetic material are described. The ferromagnetic member 102 needs to be arranged so that the thickness direction of the ferromagnetic member 102 is other than perpendicular to a direction of a straight line connecting the following two points: (a) the center point of the coil 101 as the magnetic field noise source; and (b) a center point of the ferromagnetic member 102. In other words, the flat surface 102a of the ferromagnetic member 102 needs to be opposed to the coil 101.

Figure 5A:
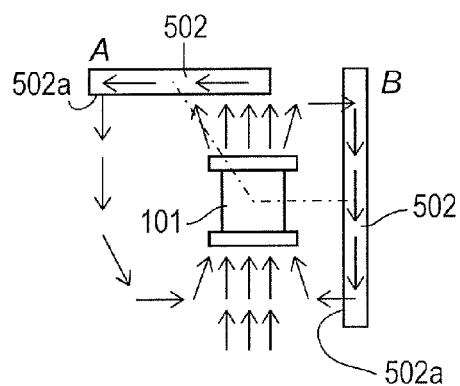
FIGS. 5A and 5B are schematic diagrams of magnetic field distributions depending on a direction of arrangement of a ferromagnetic member made of the ferromagnetic material.
Figure 5B:
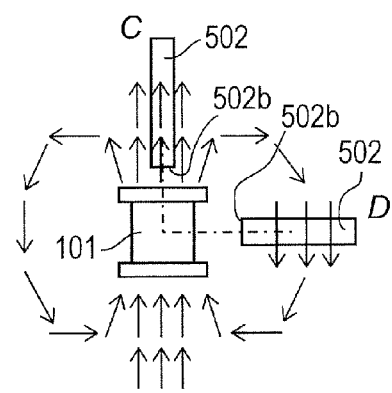

FIGS. 5A and 5B are schematic diagrams of magnetic field distributions depending on a direction of arrangement of the ferromagnetic member made of the ferromagnetic material. The dashed lines in FIGS. 5A and 5B each represent the straight line connecting the center point of the coil 101 as the magnetic field noise source and a center point of a ferromagnetic member 502. FIG. 5A illustrates cases where the ferromagnetic member 502 is arranged so that the thickness direction is other than perpendicular to the dashed lines, that is, cases where a flat surface 502a of the ferromagnetic member 502 is opposed to the coil 101. FIG. 5B illustrates cases where the ferromagnetic member 502 is arranged so that the thickness direction is perpendicular to the dashed lines, that is, cases where an end surface 502b of the ferromagnetic member 502 is opposed to the coil 101.

As illustrated in FIG. 5A, in a positional posture A and a positional posture B of the ferromagnetic member 502, when the magnetic flux that is input into one end of the ferromagnetic member 502 and exits from the other end is directed to different directions, a longitudinal direction (direction in which the ferromagnetic member extends) serves as an effective magnetic path.

When the ferromagnetic member 502 is in a positional posture C and a positional posture D illustrated in FIG. 5B, the incident direction of the magnetic flux is the longitudinal direction of the ferromagnetic member 502 in the positional posture C, which is the skin depth or more, and hence the magnetic flux is not absorbed. In the positional posture D, because the thickness direction acts as the magnetic path and the ferromagnetic member 502 is less than the skin depth, the magnetic flux passes therethrough and no effective change is made with the presence and absence of the ferromagnetic member 502.

As described above, it is a condition for obtaining the effect of reducing the magnetic field noise that the ferromagnetic member 102 is arranged so that the thickness direction is other than perpendicular to the straight line connecting the following two points: (a) the center of the coil 101; and (b) the center of the ferromagnetic member 102, and hence that the flat surface 102a of the ferromagnetic member 102 is opposed to the coil 101.

In regard to the actual effect of reducing the noise, the following experiment was performed. As with FIGS. 1A and 1B, the FINEMET (trademark) sheet manufactured by Hitachi Metals, Ltd., which is a ferromagnetic material, was placed as the ferromagnetic member 102 adjacent to the lens mount 304 in the lens housing 301 of the digital single lens reflex camera.

This sheet is processed into a frame shape (ring shape) having an outer diameter of 54 mm and an inner diameter of 35 mm so that the sheet can be arranged in the lens housing 301. In regard to the presence and absence of the ferromagnetic member 102, instead of the imaging element 203 of the digital single lens reflex camera, an air-core solenoid coil having the number of turns of 60, a diameter of 3 mm, and a length of 3 mm was placed at the position of the imaging element 203 to measure a magnetic flux density in a direction perpendicular to the light receiving surface.

For the magnetic field noise source, in the interchangeable lens 300, instead of the coil 101 implemented at the same position as in FIGS. 1A and 1B, a test coil was fixed by bonding. For the test coil, 5MDC-220K manufactured by Tokyo Parts Industrial Co., Ltd. was used. A lead wire was connected to the test coil, and a 2.72-A current having a frequency 30 kHz was input to drive only the test coil.

First, Table 4 shows the magnetic permeability and the skin depth of FINEMET (trademark), which are obtained by the single sheet magnetic measurement method, and Table 5 shows results of the measurement by the solenoid coil.

TABLE 4

Measurement result of magnetic permeability and skin depth of FINEMET (trademark)

| Thickness d [mm] | Electric conductivity | magnetic permeability | Relative magnetic permeability | Skin depth | Less than skin depth? |
|---|---|---|---|---|---|
| 0.018 | $8.33 \times 10^5$ | $2.01 \times 10^{-3}$ | 1,599 | 0.079598579 | Yes |

TABLE 5

Table of comparison of presence and absence of ferromagnetic member

|  | Without ferromagnetic member | With ferromagnetic member |
|---|---|---|
| Density of magnetic flux arriving at the light receiving surface of the imaging element | 1.32 [μT] | 0.29 [μT] |

From the above-mentioned results, it can be seen that the amount of magnetic field noise (magnetic flux) that arrives at the imaging element 203 was reduced. In other words, depending on the arrangement of the ferromagnetic member 102 made of the ferromagnetic material, the magnetic flux and hence the magnetic field noise that arrives at the imaging element 203 is reduced.

Second Embodiment

Figure 6:
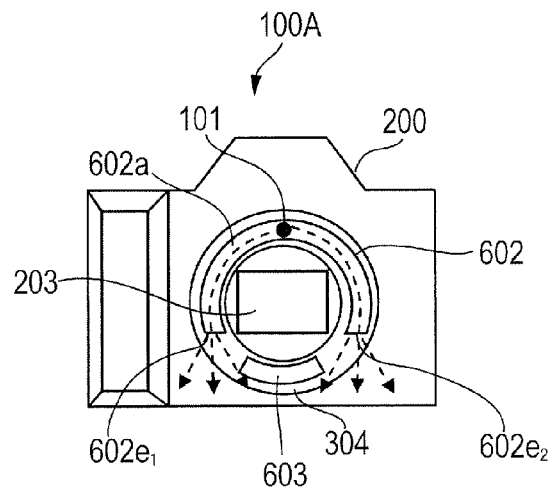
FIG. 6 is a front view illustrating an imaging apparatus according to a second embodiment of the present invention.

Next, a description is given of an imaging apparatus according to a second embodiment of the present invention. FIG. 6 is a front view illustrating a schematic configuration of a camera as the imaging apparatus according to the second embodiment of the present invention. Note that, in the second embodiment, similar components as those of the first embodiment described above are denoted by the same reference symbols, and the description thereof is omitted.

In the second embodiment, a camera 100A is a digital single lens reflex camera as with the camera 100 of the first embodiment described above, in which an interchangeable lens is attachable to and detachable from the camera main body 200, and a ferromagnetic member 602 made of a ferromagnetic material is provided in the interchangeable lens. In the second embodiment, a shape of the ferromagnetic member 602 made of the ferromagnetic material is different from the first embodiment described above. In the second embodiment, a description is given of a case where an obstacle 603 such as an electrical part, for example, a flexible cable or a connector for connecting the camera main body and the interchangeable lens, or another mechanical part is placed on the lens mount 304.

The interchangeable lens of the camera 100A includes the obstacle 603 adjacent to the lens mount 304, and hence includes the ferromagnetic member 602 made of the ferromagnetic material, which has a different shape from the first embodiment described above.

As illustrated in FIG. 6, the ferromagnetic member 602 is formed to extend along the periphery of the imaging element 203 when viewed from a direction perpendicular to the light receiving surface of the imaging element 203 (that is, in front view) in a state in which the interchangeable lens is attached to the camera main body 200. In the second embodiment, the ferromagnetic member 602 is formed into a C-shaped frame avoiding the obstacle 603 in front view. The ferromagnetic member 602 is thus formed to extend along the periphery of the imaging element 203 so that magnetic flux that otherwise flows into the imaging element 203 may be effectively absorbed by the ferromagnetic member 602. It is preferred that the direction in which the ferromagnetic member 602 extends be substantially parallel, in particular, be parallel to the tangential direction of the light receiving surface of the imaging element 203. It is also preferred that a flat surface 602a of the ferromagnetic member 602 be substantially parallel, in particular, be parallel to the light receiving surface of the imaging element 203.

In the second embodiment, a cut is made in the ring shape to avoid interference (contact) with the obstacle 603 such as the connector for connecting the camera main body 200 and the interchangeable lens.

As in the first embodiment described above, magnetic flux generated at the coil 101 is absorbed into the ferromagnetic member 602 made of the ferromagnetic material immediately below the coil 101, and passes therethrough from a part that is opposed to the coil 101 toward the both sides along the direction in which the ferromagnetic member 602 extends. Then, the magnetic flux emanates from distal ends $602e_1$ and $602e_2$ on the side opposite to the part that is opposed to the coil 101 into the air.

Then, the magnetic flux (magnetic field) that has emanated from the distal ends $602e_1$ and $602e_2$ on the side opposite to the part that is opposed to the coil 101 into the air passes through the lens housing of the interchangeable lens, and returns to the coil 101 from the side opposite to the lens mount 304.

Figure 7A:
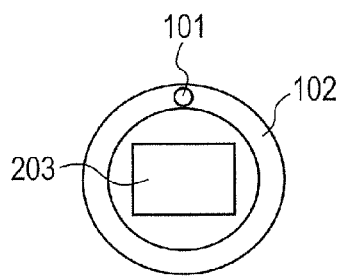
FIGS. 7A, 7B, 7C and 7D are explanatory diagrams illustrating shapes of a ferromagnetic member made of a ferromagnetic material.

FIGS. 7A to 7D are explanatory diagrams illustrating shapes of the ferromagnetic member made of the ferromagnetic material. FIG. 7A illustrates the case of the ferromagnetic member 102 having the ring shape described above in the first embodiment.

Figure 7B:
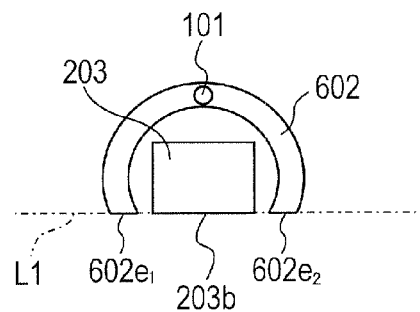

FIG. 7B illustrates a case of the ferromagnetic member 602 that is obtained by cutting the ferromagnetic member 102 having the ring shape along a tangent line L1 that passes through a side 203b farthest from the coil 101, of the four sides of the imaging element 203. In other words, the ferromagnetic member 602 is formed so that the both ends $602e_1$ and $602e_2$, which are the distal ends, contact the tangent line L1 at the side 203b farthest from the center point of the coil 101, of the four sides of the imaging element 203, when viewed from the direction perpendicular to the light receiving surface of the imaging element 203 (in front view).

Figure 7C:
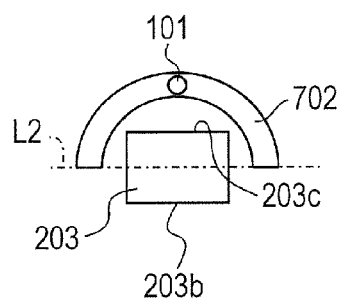
Figure 7D:
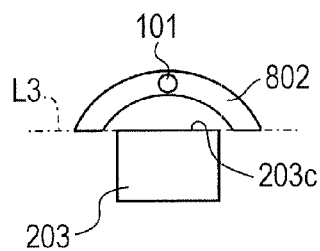

FIG. 7C illustrates a case of a ferromagnetic member 702 that is obtained by cutting the ferromagnetic member 102 having the ring shape along a line L2 that passes through the center between the side 203b farthest from the coil 101 and a side 203c nearest thereto, of the four sides of the imaging element 203. FIG. 7D illustrates a case of a ferromagnetic member 802 obtained by cutting the ferromagnetic member 102 having the ring shape along a tangent line L3 that passes through the side 203c nearest to the coil 101, of the four sides of the imaging element 203.

Figure 8:
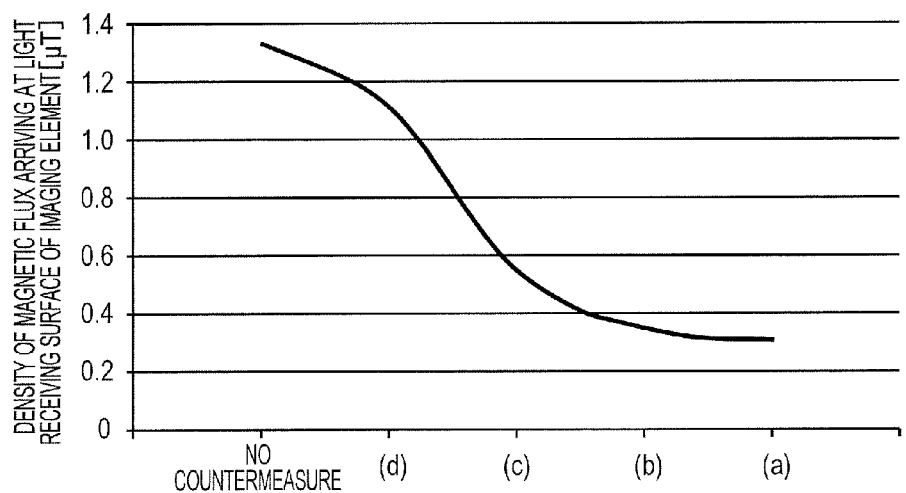
FIG. 8 is a graph showing measurement results of density of magnetic flux that has arrived at an imaging element depending on the shape of the ferromagnetic member.

FIG. 8 is a graph showing measurement results of the density of magnetic flux that has arrived at the imaging element 203 when the ferromagnetic members illustrated in FIGS. 7A to 7D are arranged.

For the measurement, the same measurement as that described above in the first embodiment was performed. With any one of the ferromagnetic members 102, 602, 702, and 802, as compared to a case where there is no ferromagnetic member made of the ferromagnetic material, the effect of reducing the magnetic flux that arrived at the imaging element 203 was observed.

However, as the cut in the ferromagnetic material becomes larger, the magnetic flux (magnetic field) that has emanated from the distal ends of the ferromagnetic member becomes easier to be transmitted to the imaging element 203, with the result that the arriving magnetic flux (magnetic field) is increased. In particular, it can be seen that as the distal ends of the ferromagnetic member made of the ferromagnetic material become closer to the center point of the coil 101 than the tangent line L1 of the side 203b farthest from the coil 101, the arriving magnetic flux increases rapidly.

In other words, it is preferred that the light receiving surface of the imaging element be arranged within a plane formed by a straight line connecting two points that are the first and second largest in distance from the center point of the coil 101 to the end portions of the frame-like ferromagnetic member and the maximum outer diameter of the frame-like ferromagnetic member.

In other words, when the ferromagnetic member 602 is formed so that the both ends $602e_1$ and $602e_2$, which are the distal ends, are in contact with the tangent line L1 or located beyond the tangent line L1 to be farther away from the center point of the coil 101 than the tangent line L1 in front view illustrated in FIG. 7B, the arriving magnetic flux may be reduced more effectively.

As described above, in the second embodiment, depending on the shape of the frame-like ferromagnetic member made of the ferromagnetic material, the magnetic field noise may be effectively reduced while avoiding the interference with another electrical part or mechanical part.

Third Embodiment

Figure 9:
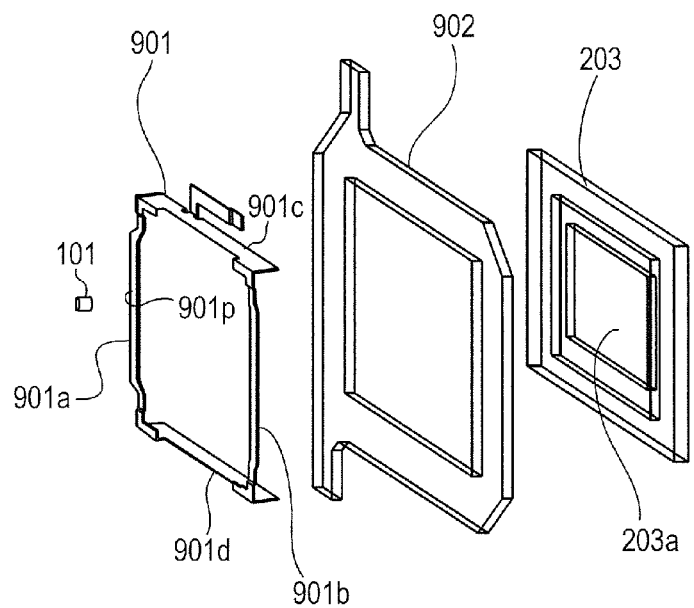
FIG. 9 is a perspective view of an imaging apparatus according to a third embodiment of the present invention.

Next, a description is given of an imaging apparatus according to a third embodiment of the present invention. FIG. 9 is a perspective view illustrating a part of components of a camera as the imaging apparatus according to the third embodiment of the present invention. The camera according to the third embodiment is, as with the camera 100 according to the first embodiment described above, a digital single lens reflex camera, in which an interchangeable lens is attachable to and detachable from the camera main body. Moreover, in the first embodiment described above, the ferromagnetic member 102 made of the ferromagnetic material is provided to the interchangeable lens, but in the third embodiment, the ferromagnetic member made of the ferromagnetic material is provided to the camera main body. Therefore, the interchangeable lens according to the third embodiment has a structure in which the ferromagnetic member 102 is omitted from the interchangeable lens 300 according to the first embodiment described above, and a detailed description with reference to the drawings is omitted. For the camera main body, only points that are different from the first embodiment described above are illustrated in FIG. 9, and for the other components similar to those of the first embodiment described above, a detailed description with reference to the drawings is omitted.

In the third embodiment, the camera, which is the imaging apparatus, includes the camera main body and the interchangeable lens, and the camera main body includes a frame-like ferromagnetic member 901 illustrated in FIG. 9.

In the camera main body, there is a shutter mechanism between the imaging element and the mount of the camera, and hence it is difficult to arrange a magnetic sheet having a large area, like the frame-like ferromagnetic member 102 arranged in the interchangeable lens described above in the first embodiment.

Therefore, in the third embodiment, as illustrated in FIG. 9, a holding member for holding an optical low pass filter, which is attached to a holding member 902 located around the imaging element 203 for holding the imaging element 203, is formed by the ferromagnetic material to serve as the ferromagnetic member 901. The ferromagnetic material is, for example, permalloy PC.

The ferromagnetic member 901 is formed, as illustrated in FIG. 9, into a quadrangular ring shape, which is a polygon, and of four side portions 901a to 901d, two side portions 901c and 901d are bent at a right angle with respect to two side portions 901a and 901b. In the third embodiment, the ferromagnetic member 901 is provided so that a flat surface 901p perpendicular to the thickness direction of the side portion 901a of the ferromagnetic member 901 is opposed to the coil 101.

For the actual effect of reducing the noise, a similar experiment as that described above in the first embodiment was performed. The density of magnetic flux arriving at the light receiving surface was compared between a case where a material of the holding member for the optical low pass filter is SUS304, which is a non-magnetic material, and a case where the material is permalloy PC, which is a ferromagnetic material.

The holding member for the optical low pass filter has a thickness of 0.2 mm. When values between the thicknesses of 0.1 mm and 0.5 mm of Table 1 are interpolated, the relative magnetic permeability is approximately 296. SUS304 has the relative magnetic permeability of 1 and the electric conductivity of $1.4 \times 10^6$.

Table 6 below shows a comparison result of the density of magnetic flux arriving at the light receiving surface of the imaging element depending on the material of the holding member for the optical low pass filter. It can be seen from Table 6 that when the material of the holding member for the optical low pass filter is permalloy PC, the arriving magnetic flux density was reduced.

TABLE 6

Comparison by difference in material of the holding member for the optical low pass filter

|  | SUS304 | Permalloy PC |
|---|---|---|
| Density of magnetic flux arriving at the light receiving surface of the imaging element | 1.06 [µT] | 0.48 [µT] |

From the above-mentioned result, the ferromagnetic member 901 made of the ferromagnetic material may be provided to reduce the magnetic field noise. Note that, another frame-like member such as the holding member 902 for holding the imaging element 203 illustrated in FIG. 9 may be formed of the ferromagnetic material.

The present invention is not limited to the embodiments described above, and various modifications may be made by a person having ordinary skill in the art within the technical idea of the present invention.

In the first and second embodiments described above, there has been described the case where the interchangeable lens is attachable to and detachable from the camera main body, and where the coil and the ferromagnetic member made of the ferromagnetic material are provided in the lens housing of the interchangeable lens, but the present invention is not limited thereto. The present invention is also applicable to an integrated camera in which the lens is integrated in the camera main body. For example, without limited to the digital single lens reflex camera, the present invention is also applicable to a digital compact camera. In this case, the coil and the ferromagnetic member are provided in the housing of the camera.

Further, in the third embodiment described above, there has been described the case where the coil is provided in the lens housing of the interchangeable lens, but the present invention is also applicable to a case where the coil is arranged in the housing of the camera main body. In any case, the camera including the interchangeable lens and the camera main body, or the camera main body itself corresponds to the imaging apparatus. Further, the present invention is also applicable to the integrated camera in which the lens is integrated in the camera main body. For example, without limited to the digital single lens reflex camera, the present invention is also applicable to the digital compact camera.

Further, in the first to third embodiments described above, there has been described the case where the imaging apparatus is the digital still camera, but the present invention is also applicable to a digital camcorder.

Further, in the first to third embodiments described above, there has been described the case where the camera itself is the imaging apparatus, but the present invention is also applicable to an imaging apparatus in which the camera is integrated in an electronic equipment main body. For example, the present invention is also applicable to a case where the camera is integrated in a portable terminal such as a portable telephone, a personal digital assistant (PDA), a tablet computer, a notebook computer, or a portable game machine main body.

Further, in the first to third embodiments described above, there has been described the case where the coil is the coil of the motor, but the present invention is not limited thereto. For example, the coil may be a coil used in an electrical circuit element such as a choke coil or a transformer.

Further, in the first to third embodiments described above, one ferromagnetic member made of the ferromagnetic material is provided, but a plurality of the ferromagnetic members may be provided. In that case, it is preferred that the plurality of ferromagnetic members be provided in a stacked manner so as to be seamless as in integral forming when the light receiving surface of the imaging element is viewed from the imaging optical system.

According to the present invention, with the ferromagnetic member formed of the ferromagnetic material having the relative magnetic permeability that is larger than that of the non-magnetic material, the skin depth caused by the skin effect becomes smaller than before, and further, with the thickness of the ferromagnetic member being less than the skin depth, the thickness of the ferromagnetic member may be made smaller than before. Moreover, with the ferromagnetic member formed of the ferromagnetic material and with the thickness of the ferromagnetic member being less than the skin depth, the generated eddy current that forms the demagnetizing field may be reduced so that the magnetic flux may be effectively absorbed by the ferromagnetic member. The magnetic flux absorbed by the ferromagnetic member does not penetrate as opposed to the case of the non-magnetic material, but passes through the inside of the ferromagnetic member to emanate from the distal end of the ferromagnetic member and returns to the coil. Therefore, the ferromagnetic member functions as the bypass of the imaging element for the magnetic flux, with the result that the amount of arrival by which the magnetic flux generated by the coil arrives at the imaging element may be reduced, and the disturbance in the picked-up image may be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-205970, filed Sep. 19, 2012, which is hereby incorporated by reference herein in its entirety.

What is claimed is:

1. An imaging apparatus, comprising:
   an imaging apparatus main body;
   a lens barrel comprising an imaging optical system, the lens barrel being attached to the imaging apparatus main body;
   an imaging element provided in the imaging apparatus main body so as to be opposed to the imaging optical system, for photoelectrically converting an optical image formed by the imaging optical system;
   a component provided to the lens barrel, for generating magnetic flux by being supplied with an alternating current; and
   a ferromagnetic member, which is formed of a ferromagnetic material into one of a plate shape and a film shape, and which is arranged between the component and the imaging element so that a part of a flat surface perpendicular to a thickness direction is opposed to the component, wherein the ferromagnetic member has a shape that surrounds the imaging element when viewed from a direction perpendicular to a light receiving surface of the imaging element, wherein the ferromagnetic member has a thickness that is less than a skin depth d, which is determined by Expression 1:

$$d = \sqrt{1/(\pi f \sigma \mu)} \qquad \text{(Expression 1)}$$

where f is a drive frequency of the component, μ is a magnetic permeability of the ferromagnetic material, and σ is an electric conductivity of the ferromagnetic material.

2. The imaging apparatus according to claim 1, wherein the drive frequency of the component comprises a frequency that is 1 kHz or more and is less than 1 MHz.

3. The imaging apparatus according to claim 1, wherein the component is a motor with a coil.

4. The imaging apparatus according to claim 1, wherein the ferromagnetic member is a ring-shaped member.

5. The imaging apparatus according to claim 1, wherein the ferromagnetic member is a C-shaped member.

6. The imaging apparatus according to claim 5, wherein the ferromagnetic member is formed so that, when viewed from the direction perpendicular to the light receiving surface of the imaging element, both ends are one of (a) in contact with a tangent line at a side farthest from the center point of the component, of sides of the imaging element, and (b) farther away from the center point of the component than the tangent line.

7. The imaging apparatus according to claim 1, wherein the ferromagnetic member has a relative magnetic permeability of 100 or more and 1,000 or less.

8. The imaging apparatus according to claim 7, wherein the ferromagnetic member contains permalloy as a main component.

9. The imaging apparatus according to claim 7, wherein the ferromagnetic member contains one of any one metal selected from the group consisting of nickel, cobalt, and iron, and an alloy containing at least two of nickel, cobalt, and iron as a main component.

10. The imaging apparatus according to claim 1, wherein the ferromagnetic member is disposed between the imaging apparatus main body and the imaging optical system.

11. An imaging apparatus main body, comprising:
a housing to which is attachable and detachable an interchangeable lens including an imaging optical system and a component for generating magnetic flux by being supplied with an alternating current;
an imaging element housed in the housing to be opposed to an attachment/detachment surface of the housing to and from which the interchangeable lens is attached and detached, for photoelectrically converting an optical image formed by the imaging optical system; and
a ferromagnetic member, which is formed of a ferromagnetic material into one of a plate shape and a film shape, and which is housed in the housing so that, when the interchangeable lens is attached to the housing, a part of a flat surface perpendicular to a thickness direction is opposed to the component, wherein the ferromagnetic member has a shape that surrounds the imaging element when viewed from a direction perpendicular to the light receiving surface of the imaging element, wherein the ferromagnetic member has a thickness that is less than a skin depth d, which is determined by Expression 1:

$$d = \sqrt{1/(\pi f \sigma \mu)} \qquad \text{(Expression 1)}$$

where f is a drive frequency of the component, μ is a magnetic permeability of the ferromagnetic material, and σ is an electric conductivity of the ferromagnetic material.

12. The imaging apparatus main body according to claim 11, wherein the ferromagnetic member has a relative magnetic permeability of 100 or more and 1,000 or less.

13. The imaging apparatus according to claim 11, wherein the component is a motor with a coil.

14. An interchangeable lens, which is attachable to and detachable from an imaging apparatus main body including an imaging element, the lens comprising:
a component for generating magnetic flux by being supplied with an alternating current;
an imaging optical system for forming an optical image on the imaging element when the lens is attached to the imaging apparatus main body; and
a ferromagnetic member, which is formed of a ferromagnetic material into one of a plate shape and a film shape, arranged at a position where a part of a flat surface perpendicular to a thickness direction is opposed to the component, and which is located between the component and the imaging element when the lens is attached to the imaging apparatus main body, wherein the ferromagnetic member has a shape that surrounds the imaging element when viewed from a direction perpendicular to the light receiving surface of the imaging element, wherein the ferromagnetic member has a thickness that is less than a skin depth d, which is determined by Expression 1:

$$d = \sqrt{1/(\pi f \sigma \mu)} \qquad \text{(Expression 1)}$$

where f is a drive frequency of the component, μ is a magnetic permeability of the ferromagnetic material, and σ is an electric conductivity of the ferromagnetic material.

15. The interchangeable lens according to claim 14, wherein the ferromagnetic member has a relative magnetic permeability of 100 or more and 1,000 or less.

16. The interchangeable lens according to claim 15, wherein the drive frequency of the coil comprises a frequency that is 1 kHz or more and is less than 1 MHz.

* * * * *